US012747695B2

(12) United States Patent
Ravindranath

(10) Patent No.: US 12,747,695 B2
(45) Date of Patent: Sep. 29, 2026

(54) SYSTEM AND METHOD FOR PREVENTING STRIKING OF FOREIGN OBJECTS ON AN AIRCRAFT ENGINE

(71) Applicant: Prathiba Ravindranath, Bangalore (IN)

(72) Inventor: Prathiba Ravindranath, Bangalore (IN)

(73) Assignee: Prathiba Ravindranath, Bangalore (IN)

( * ) Notice: Subject to any disclaimer, the term of this patent is extended or adjusted under 35 U.S.C. 154(b) by 330 days.

(21) Appl. No.: 18/669,851

(22) Filed: May 21, 2024

(65) Prior Publication Data

US 2024/0392723 A1 Nov. 28, 2024

(30) Foreign Application Priority Data

May 24, 2023 (IN) ............................ 202341036059

(51) Int. Cl.
*F02C 7/055* (2006.01)

(52) U.S. Cl.
CPC .................................. *F02C 7/055* (2013.01)

(58) Field of Classification Search
CPC ...................................................... F02C 7/055
See application file for complete search history.

(56) References Cited

U.S. PATENT DOCUMENTS 3,121,545 A * 2/1964 Meletion ................ F02C 7/055 55/306
8,052,767 B2 11/2011 Sands et al.
8,757,551 B2 6/2014 Margalit
10,774,744 B2 9/2020 Kline
12,460,549 B1 * 11/2025 Kray .................... F01D 5/3007
2011/0185700 A1 * 8/2011 Newcomer ............ F02C 7/055 60/39.092
2013/0294894 A1 * 11/2013 Kline ..................... F01D 17/10 415/208.1
2015/0176491 A1 * 6/2015 Alnafisah .............. B01D 45/08 55/306
2023/0058777 A1 * 2/2023 Currington ............ F02C 7/055

FOREIGN PATENT DOCUMENTS

CA 2637134 A1 * 1/2009 ............ B64D 33/02
DE 19545806 A1 * 8/1996 ............ B64D 33/02
EP 3546369 A1 * 10/2019 ............... F02C 9/00

(Continued)

*Primary Examiner* — Christopher P Ellis
(74) *Attorney, Agent, or Firm* — Jason C. Cameron

(57) ABSTRACT

A system 100 for preventing striking of foreign objects on an aircraft engine is disclosed. The system includes a sensing module 102 positioned at multiple locations on the aircraft engine to obtain data related to presence of a foreign object within a proximity of the aircraft engine. The system includes a processing subsystem 108 that includes an analysis module 114 to enable sensor fusion of the data to detect the presence of the foreign object using artificial intelligence. Subsequently, a signal is generated and transmitted to a protecting unit 116. The analysis module is configured to activate an Iris mechanism automatically in the protecting unit. The protecting unit includes a blade arrangement that closes thereby preventing foreign objects from striking the aircraft engine.

10 Claims, 10 Drawing Sheets

(56) References Cited

FOREIGN PATENT DOCUMENTS

| | | | | | |
|---|---|---|---|---|---|
| GB | 2467567 | A | * | 8/2010 | .............. F02C 7/055 |
| JP | 2010203290 | A | | 9/2010 | |
| KR | 20190106270 | A | * | 9/2019 | .............. F02C 7/055 |
| KR | 20250143027 | A | * | 9/2025 | .............. F02C 7/055 |
| RU | 2723210 | C1 | * | 6/2020 | ............. B64D 29/00 |
| WO | WO-2026017194 | A1 | * | 1/2026 | ............. B64D 33/02 |

* cited by examiner

SYSTEM AND METHOD FOR PREVENTING STRIKING OF FOREIGN OBJECTS ON AN AIRCRAFT ENGINE

EARLIEST PRIORITY DATE

This application claims priority from a complete patent application filed in India having patent application No. 202341036059, filed on 24th day of May 2023, and titled "SYSTEM AND METHOD FOR PREVENTING STRIKING OF FOREIGN OBJECTS ON AN AIRCRAFT ENGINE".

FIELD OF INVENTION

Embodiments of the present disclosure relate to a field of protection of aircraft and more particularly to a system and method for preventing striking of foreign objects on an aircraft engine.

BACKGROUND

Generally, aircraft engines are mounted on both sides of the wings of aircrafts. A common problem that exists today is the striking of foreign objects on the aircraft engines. Usually, the foreign objects are difficult or rather impossible to remove or control. Specifically, birds are attracted to the aircraft engines thereby causing bird strikes. Predominately, the bird strikes occur during takeoff, landing and during daytime.

Typically, the bird strikes lead to several problems, such as flight delays, flight cancellation and stress on pilots when birds are noticed during operation. There are reports of emergency landings shortly after takeoff. Additionally, bird strikes provides unpleasant experiences and can injure the passengers. The aircraft's crew members and passengers are put at risk due to a number of crashes with fatalities. Another distinct problem is the injection of birds as they pass through the aircraft engines and eventually succumbs. Consequently, there is significant damage to several portions of the aircraft engine or can inactivate the aircraft engines. Currently, the number of bird strikes are increasing and thus protecting the aircraft engines is crucial.

Several existing solutions include placing a fixed gate or a screen in front of the aircraft engine. However, in such cases, airflow is prevented from passing through the aircraft engine and thus results in additional fuel consumption.

Hence, there is a need for an improved system and a method for preventing striking of foreign objects on an aircraft engine to address the aforementioned issue(s).

Objective of the Invention

An objective of the invention includes preventing striking of foreign objects on an aircraft engine by closing a plurality of blades having a grilled mesh near the aircraft engine when the foreign objects are detected within a proximity.

Another objective of the invention includes sustaining fuel efficiency of the aircraft engine by the use of the grilled mesh that are used for a short period of time.

BRIEF DESCRIPTION

In accordance with an embodiment of the present disclosure, a system for preventing striking of foreign objects on an aircraft engine is provided. The system includes a sensing module comprising of a plurality of sensors positioned at multiple locations on a front section and a lateral section of the aircraft engine wherein the plurality of sensors is configured to obtain a plurality of data related to presence of the one or more foreign objects within a proximity of the aircraft engine. The system includes a processing subsystem hosted on a server. The processing subsystem is configured to execute on a network to control bidirectional communications among a plurality of modules. The processing subsystem includes an analysis module operatively coupled to the sensing module wherein the vision module is configured to enable sensor fusion upon receiving the plurality of data from the sensing module to retrieve meaningful results pertaining to the presence of the one or more foreign objects using artificial intelligence. The analysis module is also configured to detect the presence of the one or more foreign objects based on the sensor fusion and generate a signal upon detecting the presence of the one or more foreign objects. The system includes a protecting unit operatively coupled with the analysis module wherein the protective unit is configured to receive the generated signal from the analysis module. The protecting unit includes a blade arrangement adapted to cover the aircraft engine. The blade arrangement includes a base plate operatively coupled with the aircraft engine. The base plate includes a concentric circular projection with a diameter less than the diameter of the base plate, wherein the concentric circular projection includes at least two arc-shaped slots arranged diametrically opposite to each other. The base plate also includes a projected arch along the boundary of the base plate. Further, the blade arrangement includes a plurality of blades with a meshed structure of a predetermined shape operatively coupled with the base plate, wherein the meshed structure allows airflow and prevents overlapping of the blade pair. Furthermore, the blade arrangement includes a blade actuating ring operatively coupled with the plurality of blades by means of a plurality of pins, wherein the blade actuating ring is configured to oscillate based on the generated signal thereby opening and closing of the plurality of blades wherein the closing of the plurality of blades prevents the one or more foreign bodies to strike the aircraft engine. The blade actuation ring is coupled with a top plate by means of a plurality of pins, wherein the top plate comprises a circular structure with the at least two arc-shaped slots on the surface of the circular structure.

In accordance with another embodiment of the present disclosure, a method for preventing striking of foreign bodies on aircraft engines is provided. The method includes obtaining, by a sensing module, a plurality of data related to the presence of one or more foreign objects within a proximity to the aircraft engine. The method includes enabling, by an analysis module, sensor fusion upon receiving the plurality of data from the sensing module to retrieve meaningful results pertaining to the presence of the one or more foreign objects using artificial intelligence. The method also includes detecting, by an analysis module, the presence of the one or more foreign objects based on the sensor fusion. The method includes generating, by an analysis module, a signal upon detecting the presence of the one mor more foreign objects. Further, the method includes receiving, by a protecting unit, the generated signal from the analysis module. Furthermore, the method includes allowing, by a plurality of blades airflow and prevents overlapping of the blade pair. Moreover, the method includes oscillating, by a blade actuating ring, based on the generated signal thereby opening and closing of the plurality of blades wherein the closing of the plurality of blades prevents the one or more foreign bodies to strike the aircraft engine.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
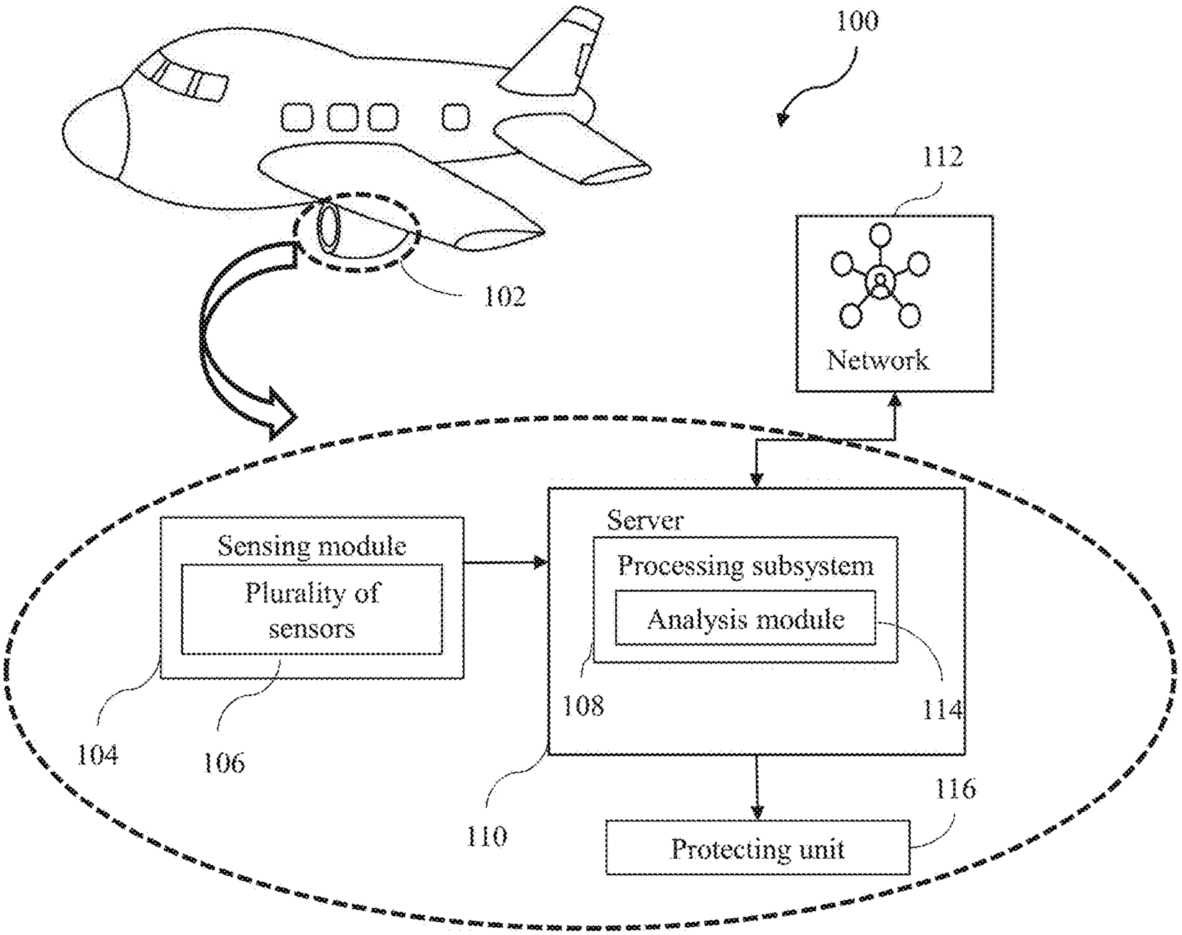
FIG. 1 is a block diagram representation of a system for preventing striking of foreign objects on an aircraft engine in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms “comprises”, “comprising”, or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by “comprises . . . a” does not, without more constraints, preclude the existence of other devices, sub-systems, elements, structures, components, additional devices, additional sub-systems, additional elements, additional structures, or additional components. Appearances of the phrase “in an embodiment”, “in another embodiment” and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms “a”, “an”, and “the” include plural references unless the context clearly dictates otherwise.

Embodiments of the present disclosure relate to a system and method for preventing striking of foreign objects on an aircraft engine. The system includes a sensing module comprising of a plurality of sensors positioned at multiple locations on a front section and a lateral section of the aircraft engine wherein the plurality of sensors is configured to obtain a plurality of data related to presence of the one or more foreign objects within a proximity of the aircraft engine. The system includes a processing subsystem hosted on a server. The processing subsystem is configured to execute on a network to control bidirectional communications among a plurality of modules. The processing subsystem includes an analysis module operatively coupled to the sensing module wherein the vision module is configured to enable sensor fusion upon receiving the plurality of data from the sensing module to retrieve meaningful results pertaining to the presence of the one or more foreign objects using artificial intelligence. The analysis module is also configured to detect the presence of the foreign objects based on the sensor fusion and generate a signal upon detecting the presence of the one or more foreign objects.

The system includes a protecting unit operatively coupled with the analysis module wherein the protective unit is configured to receive the generated signal from the analysis module. The protecting unit includes a blade arrangement adapted to cover the aircraft engine. The blade arrangement includes a base plate operatively coupled with the aircraft engine. The base plate includes a concentric circular projection with a diameter less than the diameter of the base plate, wherein the concentric circular projection includes at least two arc-shaped slots arranged diametrically opposite to each other. The base plate also includes a projected arch along the boundary of the base plate. Further, the blade arrangement includes a plurality of blades with a meshed structure of a predetermined shape operatively coupled with the base plate, wherein the meshed structure allows airflow and prevents overlapping of the blade pair. Furthermore, the blade arrangement includes a blade actuating ring operatively coupled with the plurality of blades by means of a plurality of pins, wherein the blade actuating ring is configured to oscillate based on the generated signal thereby opening and closing of the plurality of blades wherein the closing of the plurality of blades prevents the one or more foreign bodies to strike the aircraft engine. The blade actuation ring is coupled with a top plate by means of a plurality of pins, wherein the top plate comprises a circular structure with the at least two arc-shaped slots on the surface of the circular structure.

FIG. 1 is a block diagram representation of a system 100 for preventing striking of foreign objects on an aircraft engine 102 in accordance with an embodiment of the present disclosure. The system 100 includes a sensing module 104. Further, the sensing module 104 includes a plurality of sensors 106 positioned at multiple locations on a front section and a lateral section of the aircraft engine (not shown in FIG. 1). In a preferred embodiment, the plurality of sensors 106 includes a motion detection camera and an infrared sensor. The motion detection camera is a security camera that uses motion activation to turn 'ON. In other words, the motion detection camera is triggered by motion sensor that is adapted to identify a moving foreign object in proximity by using Passive Infrared (PIR) motion sensor technology. Further, the infrared sensor is an electronic device that is configured to emit and detect radiation to identify one or more foreign objects in proximity. In one embodiment, the infrared sensor is also adapted with heat sensing. Typically, the plurality of sensors 106 is configured to obtain a plurality of data related to the presence of the one or more foreign objects within a proximity of the aircraft engine 102.

Examples of the one or more foreign objects includes, but is not limited to, birds, leaves, scraps of paper and airborne debris. In a preferred embodiment, the following discussion describes a system and method to prevent bird strikes on the aircraft engine 102.

It will be appreciated to those skilled in the art that the plurality of sensors is not limited to the said and can include any other suitable sensor that can obtain the plurality of data related to the presence of the one or more foreign objects.

The system 100 also includes a processing subsystem 108. The processing subsystem 108 is hosted on a server 110 and configured to execute on a network 112 to enable communications among a plurality of modules. In one embodiment, the server 110 may include a cloud server. In another embodiment, the server 110 may include a local server. In one embodiment, the network 112 may include a wired network such as a local area network (LAN). In another embodiment, the network technologies may include a wireless network such as Wi-Fi, Bluetooth, Zigbee, near field communication (NFC), infra-red communication (RFID), and the like. Further, the processing subsystem 108 includes an analysis module 114.

The analysis module 114 is operatively coupled to the sensing module 104. Further, the analysis module 114 is configured to enable sensor fusion upon receiving the plurality of data from the sensing module 104 to retrieve meaningful results pertaining to the presence of the one or more foreign objects using artificial intelligence. Examples of the artificial intelligence algorithm includes, but are not limited to, a Deep Neural Network (DNN), Convolutional Neural Network (CNN), Restricted Boltzmann Machine (RBM), Deep Belief Network (DBN) and Deep Q-Networks. Further, sensor fusion is a process of merging the plurality of data received from the sensing module 104 to reduce the amount of uncertainty that may be involved in the plurality of data. The analysis module 114 is also configured to detect the presence of the one or more foreign objects based on the sensor fusion. Further, the analysis module 114 is configured to generate a signal upon detecting the presence of the one or more foreign objects.

It must be noted that all the information upon sensor fusion is collected by an Onboard Diagnosis System (OBDS) configured in the analysis module 114. The OBDS activates an Iris mechanism to open and close a grilled mesh pertaining to a protecting unit 116 when the foreign object(s) is found near the aircraft engine. The activation occurs in response to the generated signal. Specifically, the Iris mechanism closed a blade arrangement configured in the protecting unit 116 until the one or more foreign bodies (detected as an obstacle) passes by the aircraft engine 102. Therefore, the aircraft engine 102 is protected automatically from the one or more foreign objects. It must be noted the Iris mechanism is adapted to close the plurality of blades only for a short period of time when the one or more foreign objects are identified.

The system 100 includes the protecting unit 116 operatively coupled to the analysis module 114. Typically, the protecting unit 116 covers the aircraft engine 102 within the inner diameter. Further, the protecting unit 116 is configured to receive the signal from the analysis module 114. The protecting unit 116 includes a blade arrangement (not shown in FIG. 1) that is adapted to cover the aircraft engine when the foreign object is detected in proximity and in response to receiving the signal. The description of the protecting unit 116 and the blade arrangement is further explained in FIG. 2.

Figure 2:
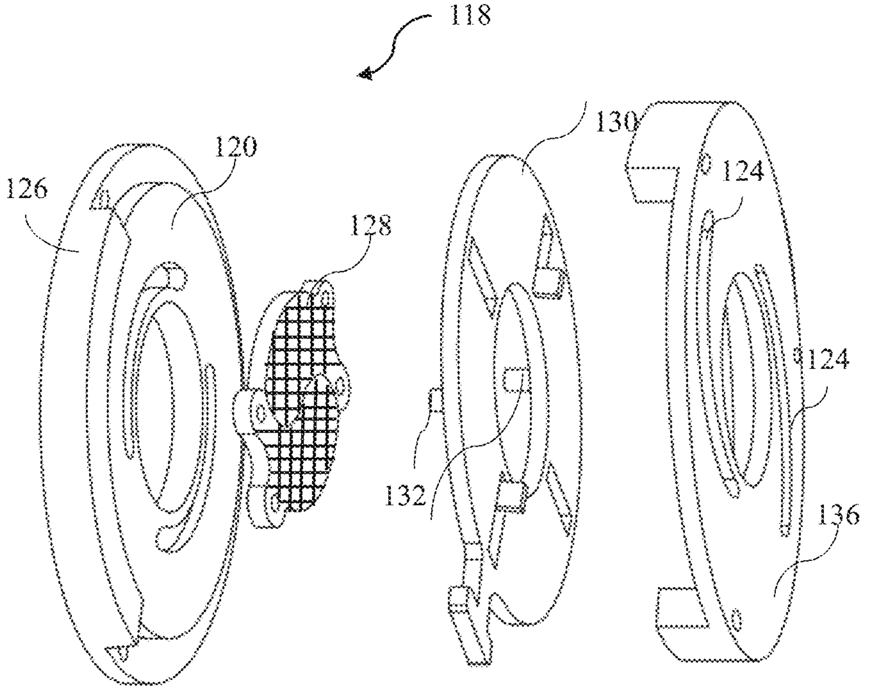
FIG. 2 is an exploded top view of a blade arrangement of one embodiment of the system of FIG. 1, in accordance with an embodiment of the present disclosure.

FIG. 2 is an exploded top view of a blade arrangement 118 of one embodiment of the system of FIG. 1, in accordance with an embodiment of the present disclosure. Specifically, the blade arrangement 118 is adapted to cover the aircraft engine. The blade arrangement 118 includes a base plate 120, a plurality of blades 128, a blade actuating ring 130, a plurality of pins 132 and a top plate 136. It must be noted that the top plate 136 and base plate 120 encloses the plurality of blades 128 and the blade actuating ring 130 with the aid of the plurality of pins 132.

The base plate 120 is operatively coupled to the aircraft engine 102 and is configured with a concentric circular projection 122 and a projected arch 126. The concentric circular projection 122 is adapted to fit into the based plate 120 and therefore has a diameter less than the diameter of the base plate 120. Further the concentric circular projection 122 includes at least two arc-shaped slots 124 arranged diametrically opposite to each other. The projected arch 126 is positioned along the boundary (or circumference) of the base plate 120.

The plurality of blades 128 includes a meshed structure of a predetermined shape operatively coupled with the base plate 120, wherein the meshed structure allows airflow (fuel economy) and prevents overlapping of the plurality of blades 128. Further, the plurality of blades 128 are actuated to an open and close position by means of a motor (not shown in FIG. 2). In one embodiment, the size of the meshed structure may vary in size to ensure that even very small foreign objects do not get injected into the aircraft engine. For instance, the meshed structure may be 1.5 inch in size so that even the smallest bird like the hummingbird does not get injected.

The blade actuating ring 130 is operatively coupled with the plurality of blades 128 by means of the plurality of pins 132. Typically, the blade actuating ring 130 is from striking to oscillate based on the generated signal thereby opening and closing of the plurality of blades 128 wherein the closing of the plurality of blades 128 prevents the one or more foreign bodies to strike the aircraft engine 102. Further, the blade actuation ring 134 is coupled with the top plate 136 by means of the plurality of pins 132. The plurality of pins 132 are located at the blade actuation ring 134 and projects to the top plate 136. The top plate 136 includes a circular structure with the at least two arc-shaped slots 124 on the surface of the circular structure. The at least two arc-shaped slots 124 is configured to accommodate the plurality of pins 132.

In one embodiment, the blade actuating ring 130 is operated by an external device, for instance, a motor. Typically, the motor is adapted to oscillate the blade actuating ring 130. Further, it must be noted that the blade actuating ring 130 oscillates only in response to the signal from the OBDS.

Figure 3:
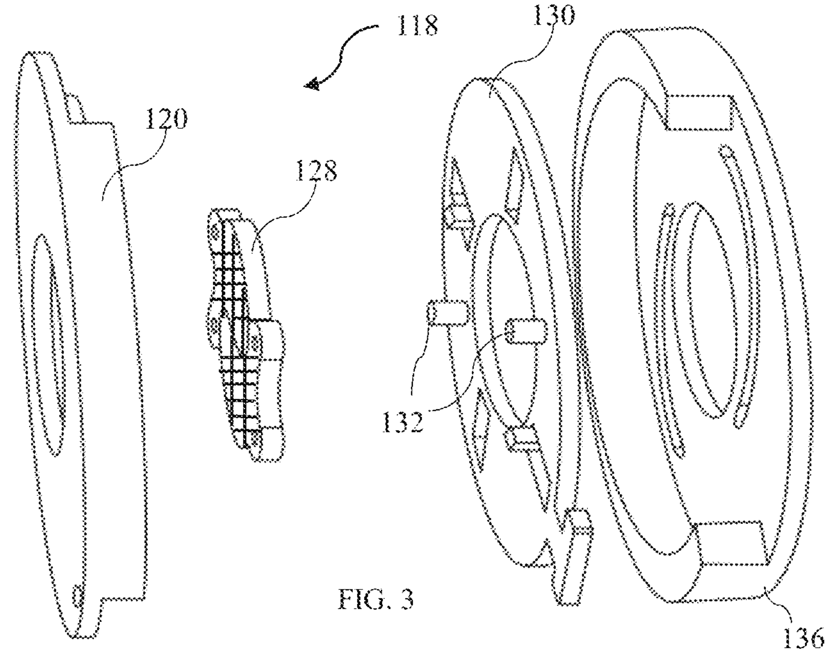
FIG. 3 is an exploded bottom view of the blade arrangement of one embodiment of the system of FIG. 1, in accordance with an embodiment of the present disclosure.

FIG. 3 is an exploded bottom view of the blade arrangement 118 of one embodiment of the system of FIG. 1, in accordance with an embodiment of the present disclosure.

Figure 4:
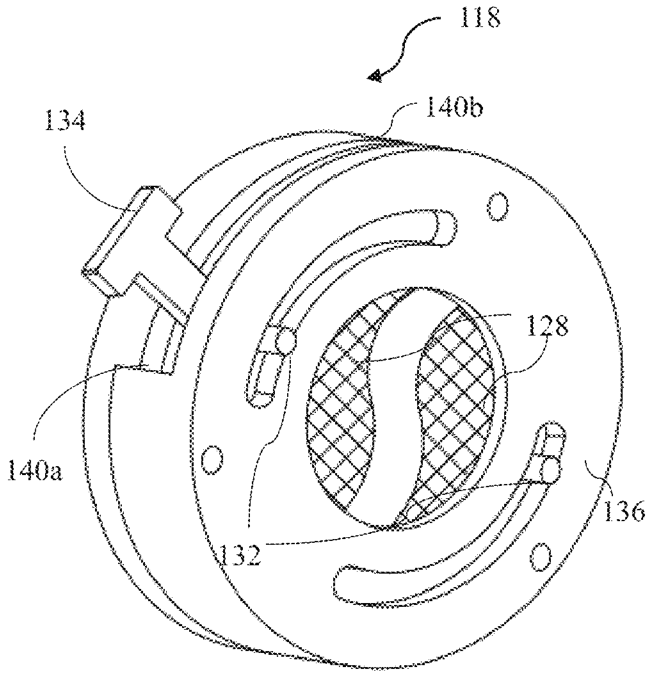
FIG. 4 is a front view of the blade arrangement when a plurality of blades is partially opened of one embodiment of the system of FIG. 1, in accordance with an embodiment of the present disclosure.

FIG. 4 is a front view of the blade arrangement 118 when a plurality of blades is partially opened of one embodiment of the system of FIG. 1, in accordance with an embodiment of the present disclosure. The blade arrangement 118 includes the blade actuating ring 134 that is adapted to oscillate in the direction shown between point A (140*a*) and point B (140*b*). Further, the blade arrangement 118 includes two meshed blades 128. Furthermore, the blade arrangement 118 includes inbuilt slots positioned on the top plate to accommodate a plurality of pins 132. It must be noted that as the blade actuating ring 134 oscillates from point A (140*a*) to point B (140*b*) with the aid of the plurality of pins 132, the meshed blades 128 open.

Figure 5:
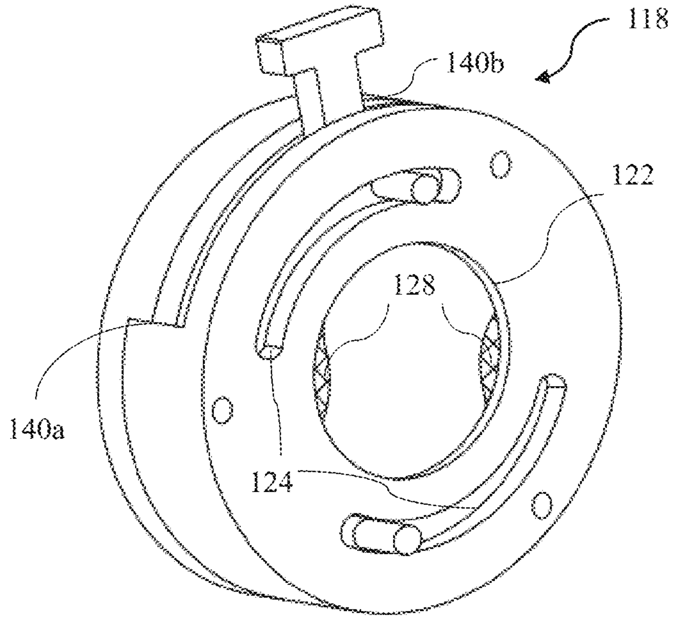
FIG. 5 is a front view of the blade arrangement when the plurality of blades is completely opened of one embodiment of the system of FIG. 1, in accordance with an embodiment of the present disclosure.

FIG. 5 is a front view of the blade arrangement when the plurality of blades is completely opened of one embodiment of the system of FIG. 1, in accordance with an embodiment of the present disclosure. As the blade actuating ring moves towards point B (140*b*) from point A (140*a*), the plurality of blades 128 is opened. In other words, the blade arrangement 118 illustrates the plurality of blades 128 when it is completely opened in response to the analysis module detecting the absence of the one or more foreign objects in proximity to the aircraft engine.

Figure 6:
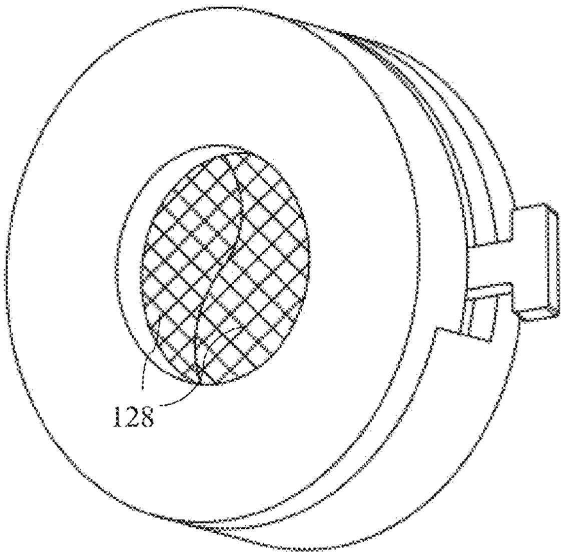
FIG. 6 is a back view of the blade arrangement when the plurality of blades is completely closed of one embodiment of the system of FIG. 1, in accordance with an embodiment of the present disclosure.

FIG. 6 is a back view of the blade arrangement when the plurality of blades is completely closed of one embodiment of the system of FIG. 1, in accordance with an embodiment of the present disclosure. The plurality of blades 118 is closed in response to the analysis module detecting the presence of the one or more foreign objects in proximity to the aircraft engine.

Figure 7:
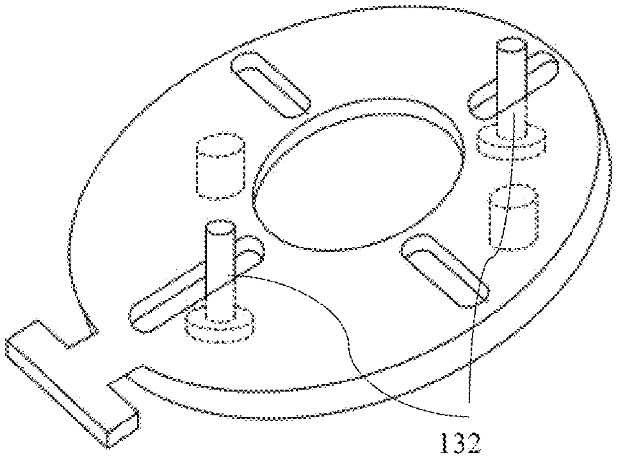
FIG. 7 is a front view of a blade actuating ring of one embodiment of the system of FIG. 1, in accordance with an embodiment of the present disclosure.

FIG. 7 is a front view of a blade actuating ring of one embodiment of the system of FIG. 1, in accordance with an embodiment of the present disclosure. The blade actuating ring 134 is coupled with a top plate 136 by means of the plurality of pins 132.

Figure 8A:
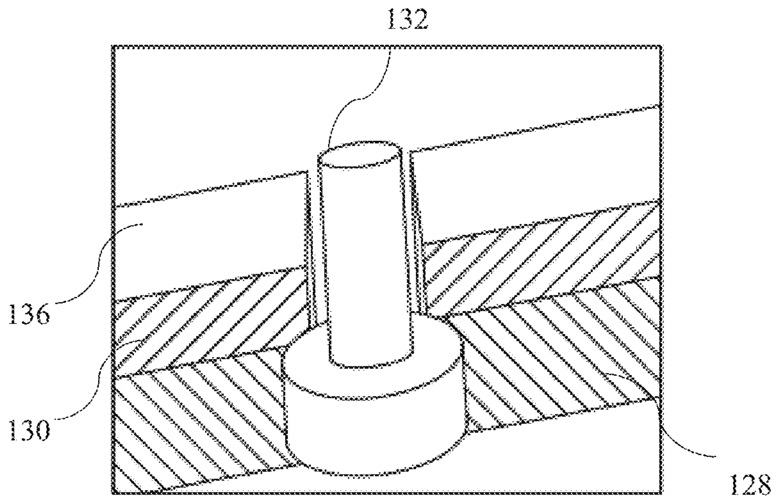
FIG. 8*a* is a cross sectional view of a pin of the blade actuating ring of one embodiment of the system of FIG. 1, in accordance with an embodiment of the present disclosure.

FIG. 8*a* is a cross sectional view of a pin of the blade actuating ring of one embodiment of the system of FIG. 1, in accordance with an embodiment of the present disclosure. The pin 132 is adapted to couple the plurality of blades 128 with the blade actuating ring 130. Further the pin 132 protrudes from the top plate 136.

Figure 8B:
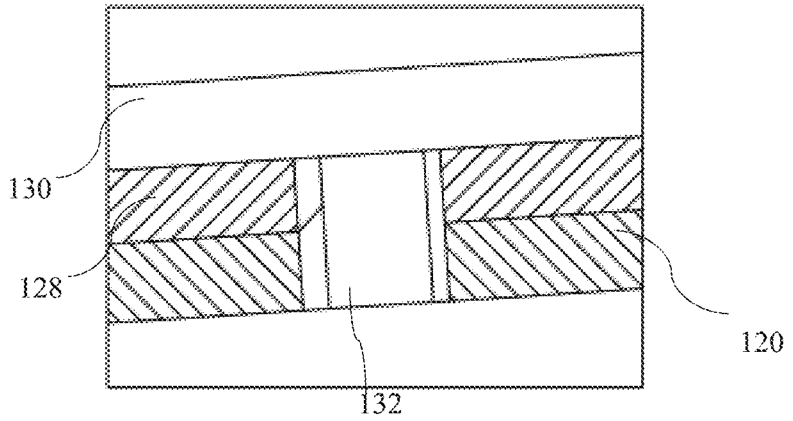
FIG. 8*b* is another cross sectional lateral view of the blade actuating ring of one embodiment of the system of FIG. 1, in accordance with an embodiment of the present disclosure.

FIG. 8*b* is another cross sectional lateral view of the blade actuating ring of one embodiment of the system of FIG. 1, in accordance with an embodiment of the present disclosure. The pin 132 is adapted to couple the blade actuating ring 130 with the plurality of blades 128 on the base plate 120. In other words, the pin 132 is fixed on the blade actuating ring 130 and is mounted to the plurality of blades 128 and the base plate 120.

Figure 9:
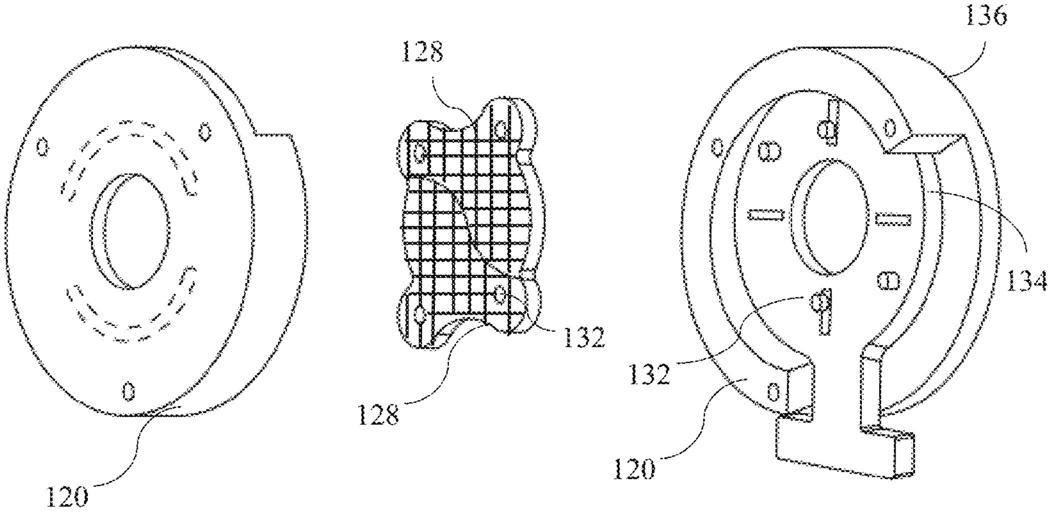
FIG. 9 is an exploded view of the blade arrangement along with pins of one embodiment of the system of FIG. 1, in accordance with an embodiment of the present disclosure.

FIG. 9 is an exploded view of the blade arrangement along with pins of one embodiment of the system of FIG. 1, in accordance with an embodiment of the present disclosure. The blade actuating ring 134 includes a plurality of pins 132. In one embodiment, the number of pins in four. In such an embodiment, two pins are mounted on the top plate 136 and the other two pins are mounted on the base plate 120. It must be noted that the larger diameter of the plurality of pins 132 is mounted towards the blade actuating ring 130 and the smaller diameter of the plurality of pins 132 is mounted towards the top plate 136.

Figure 10A:
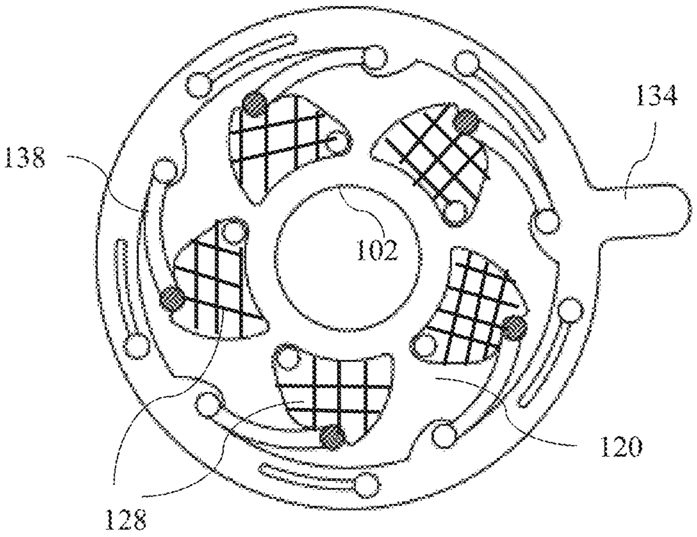
FIG. 10*a* and FIG. 10*b* are schematic representations of an exemplary blade arrangement in an open position and closed position respectively of one embodiment of the system of FIG. 1, in accordance with an embodiment of the present disclosure.
Figure 10B:
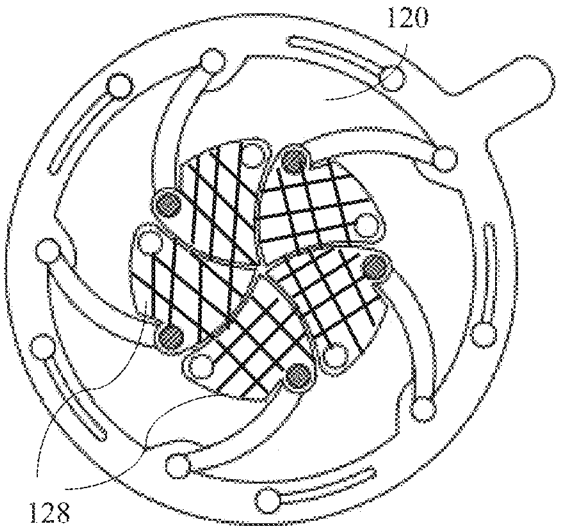

FIG. 10*a* and FIG. 10*b* are schematic representations of an exemplary blade arrangement in an open position and closed position respectively of one embodiment of the system of FIG. 1, in accordance with an embodiment of the present disclosure. FIG. 10*a* represents the blade arrangement (with 5 blades) in an open position. The plurality of blades 128 is fixed at one end on the base plate 120 by means of corresponding screws. The other end of the plurality of blades is connected to the blade actuating ring by means of a lever 138. It must be noted that the inner diameter of the aircraft engine 102 is open.

FIG. 10*b* represents the blade arrangement in a closed position. It must be noted that the inner diameter of the aircraft engine 102 is closed by the plurality of blades 128.

Figure 11A:
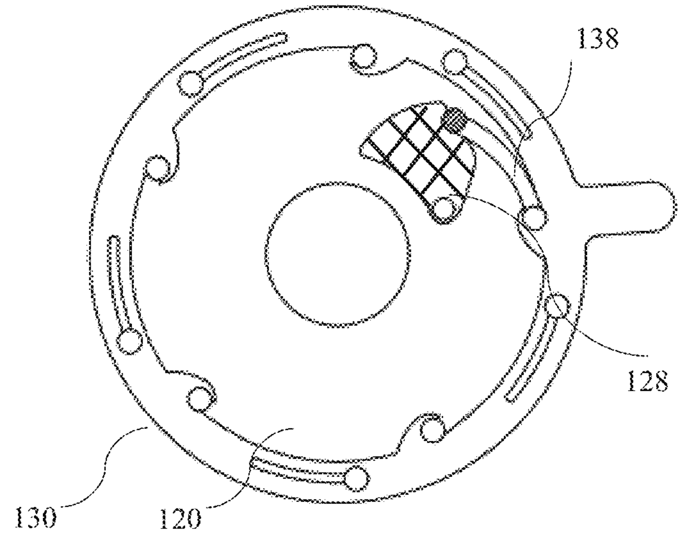
FIG. 11*a* and FIG. 11*b* are schematic representations of another exemplary blade arrangement in an open position and closed position respectively of one embodiment of the system of FIG. 1, in accordance with an embodiment of the present disclosure.
Figure 11B:
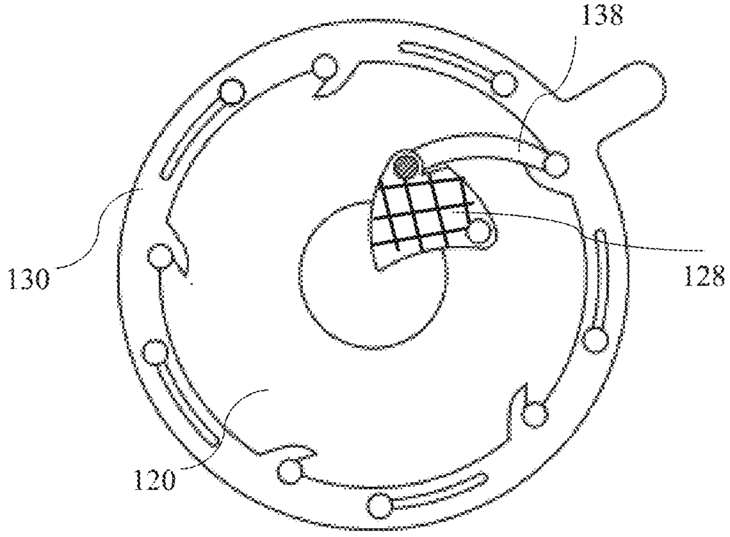

FIG. 11*a* and FIG. 11*b* are schematic representations of another exemplary blade arrangement in an open position and closed position respectively of one embodiment of the system of FIG. 1, in accordance with an embodiment of the present disclosure. FIG. 11*a* represents the blade arrangement (with a single blade) in an open position. Likewise, FIG. 11*b* represents the blade arrangement in a closed position.

Figure 12:
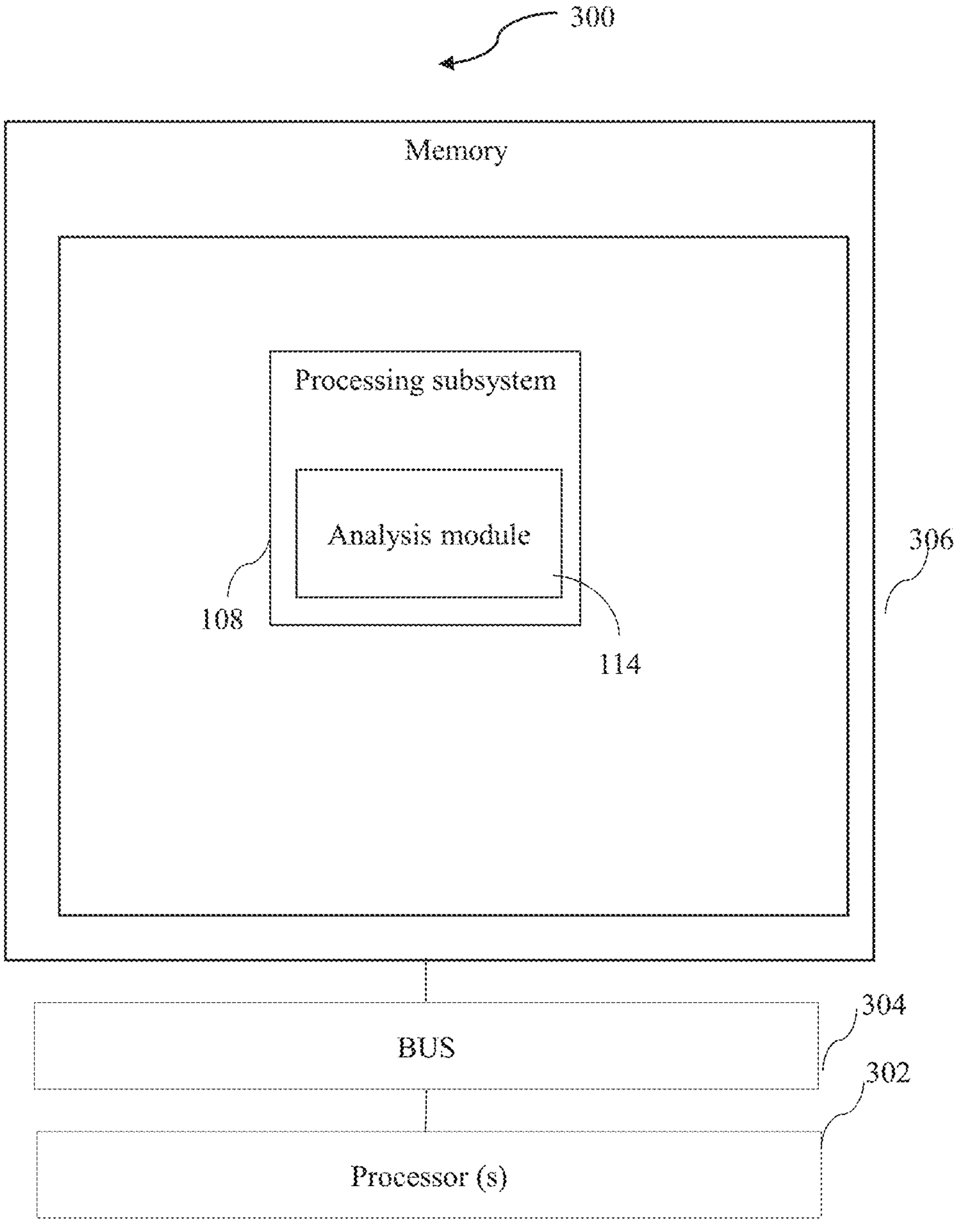
FIG. 12 is a block diagram of a computer or a server in accordance with an embodiment of the present disclosure.

FIG. 12 is a block diagram of a computer or a server in accordance with an embodiment of the present disclosure. The server includes processor(s), and memory operatively coupled to the bus. The processor(s), as used herein, includes any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory includes several subsystems stored in the form of executable program which instructs the processor to perform the method steps illustrated in FIG. 1. The memory is substantially similar to the system of FIG. 1. The memory has the following subsystems: the processing subsystem 108 includes the analysis module 114. The analysis module 114 of the processing subsystem 108 performs the functions as stated in FIG. 1. The bus used herein refers to the internal memory channels or computer network that is used to connect computer components and transfer data between them. The bus includes a serial bus or a parallel bus, wherein the serial bus transmit data in bit-serial format and the parallel bus transmit data across multiple wires. The bus used herein may include but not limited to, a system bus, an internal bus, an external bus, an expansion bus, a frontside bus, a backside bus, and the like.

The analysis module 114 is operatively coupled to the sensing module 104. Further, the analysis module 114 is configured to enable sensor fusion upon receiving the plurality of data from the sensing module 104 to retrieve meaningful results pertaining to the presence of the one or more foreign objects using artificial intelligence. Examples of the artificial intelligence algorithm includes, but are not limited to, a Deep Neural Network (DNN), Convolutional Neural Network (CNN), Restricted Boltzmann Machine (RBM), Deep Belief Network (DBN) and Deep Q-Networks. Further, sensor fusion is a process of merging the plurality of data received from the sensing module 104 to reduce the amount of uncertainty that may be involved in the plurality of data. The analysis module 114 is also configured to detect the presence of the foreign objects based on the sensor fusion. Further, the analysis module 114 is configured to generate a signal upon detecting the presence of the one or more foreign objects.

Computer memory elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processor(s).

Figure 13:
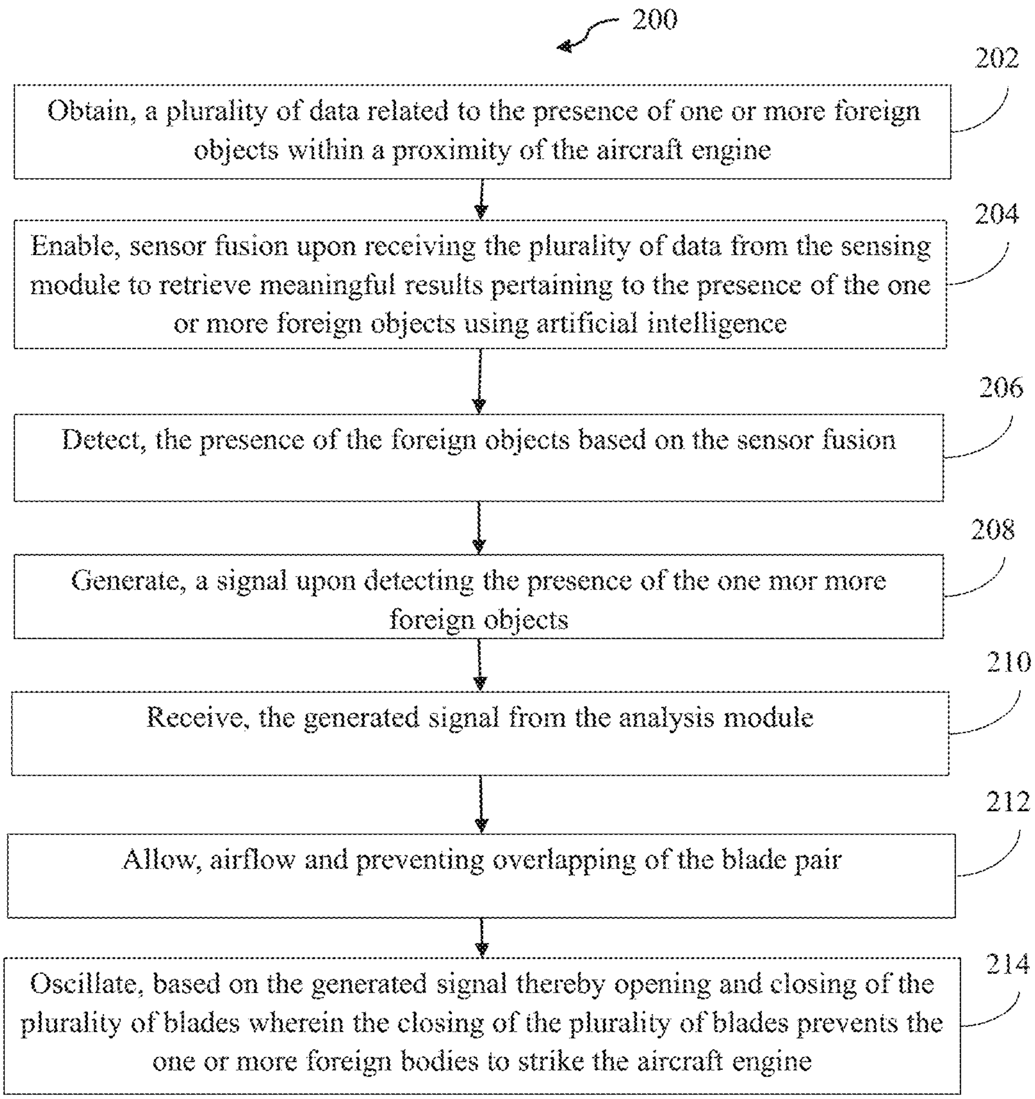
FIG. 13 is a flow chart representing the steps involved in a method for preventing striking of foreign objects on an aircraft engine in accordance with an embodiment of the present disclosure.

FIG. 13 is a flow chart representing the steps involved in a method for preventing striking of foreign objects on an aircraft engine in accordance with an embodiment of the present disclosure. The method includes obtaining, by a sensing module, a plurality of data related to the presence of one or more foreign objects within a proximity of the aircraft engine in step 202. The sensing module includes a plurality of sensors positioned at multiple locations on the aircraft engine. The primary role of the plurality of sensors is to obtain accurate results when one or more foreign objects are in proximity to the aircraft engine.

In one embodiment, the sensing module includes a motion sensor configured to detect a motion of the one or more foreign objects to activate an image-capturing device by using passive infrared detection technology.

In another embodiment, the sensing module includes a motion detection camera configured with motion activation, wherein the motion detection camera is triggered by the motion sensor.

In yet another embodiment, the sensing module includes an infrared sensor to detect the presence of the one or more foreign objects within a proximity to the aircraft engine.

The method includes enabling, by an analysis module, sensor fusion upon receiving the plurality of data from the sensing module to retrieve meaningful results pertaining to the presence of the one or more foreign objects using artificial intelligence in step 204. The sensor fusion is a process of merging an output of the plurality of sensors to reduce the uncertainty in the generated signals.

The analysis module is configured with an on-board diagnosis mechanism to activate a protecting unit in response to detecting the presence of the foreign objects based on the sensor fusion. Further, the on-board diagnosis mechanism activates an Iris mechanism via the generated signal, to open and close the blade arrangement (of the protecting unit) based on the plurality of data fetched from the plurality of sensors. The Iris mechanism closes the blade arrangement until the one or more foreign bodies are detected as an obstacle, thereby protecting the aircraft engine automatically from the one or more foreign objects. It must be noted that the Iris mechanism is closed only for a short duration, when the one or more foreign objects are identified, and subsequently opens up in the absence of obstacles.

The method includes detecting, by an analysis module, the presence of the foreign objects based on the sensor fusion in step 206.

The method includes generating, by an analysis module, a signal upon detecting the presence of the one more foreign objects in step 208.

The method includes receiving, by a protecting unit, the generated signal from the analysis module in step 210. The protecting unit includes a blade arrangement, a plurality of blades and a blade actuating ring.

Further, the method includes allowing by the plurality of blades airflow and preventing overlapping of the blade pair in step 212. The plurality of blades is actuated to an open and close position by means of a motor. Typically, the plurality of blades covers the inner diameter of the aircraft engine.

Furthermore, the method includes oscillating, by the blade actuating ring, based on the generated signal thereby opening and closing of the plurality of blades wherein the closing of the plurality of blades prevents the one or more foreign bodies to strike the aircraft engine in step 214.

Various embodiments of the system and method for preventing striking of foreign objects on an aircraft engine described above enable various advantages. The closing of the blade arrangement ensures that the foreign objects do not damage or inactivate the aircraft engine. Particularly, in the case of bird strikes, the blade arrangement ensures that the birds do not die. Further, the use of meshed blades allows air flow into the aircraft engine. Consequently, fuel efficiency is not affected.

It will be understood by those skilled in the art that the foregoing general description and the following detailed description are exemplary and explanatory of the disclosure and are not intended to be restrictive thereof. While specific language has been used to describe the disclosure, any limitations arising on account of the same are not intended.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all the acts need to be necessarily performed. Also, those acts that are not dependent on other acts may be performed in parallel with the other acts. The scope of embodiments is by no means limited by these specific examples.

I claim:

1. A system for preventing the striking of foreign objects on an aircraft engine comprises:

a sensing module comprising a plurality of sensors positioned at multiple locations on a front section and a lateral section of the aircraft engine wherein the plurality of sensors is configured to obtain a plurality of data related to the presence of the one or more foreign objects within a proximity of the aircraft engine;

a processing subsystem hosted on a server, and configured to execute on a network to control bidirectional communications among a module comprising:

an analysis module operatively coupled to the sensing module wherein the analysis module is configured to:

enable sensor fusion upon receiving the plurality of data from the sensing module to retrieve meaningful results pertaining to the presence of the one or more foreign objects using artificial intelligence;

detect the presence of the foreign objects based on the sensor fusion; and generate a signal upon detecting the presence of the one or more foreign objects;

a protecting unit operatively coupled with the analysis module wherein the protective unit is configured to receive the generated signal from the analysis module, wherein the protective unit comprises:

a blade arrangement adapted to cover the aircraft engine, wherein the blade arrangement comprises:

a base plate operatively coupled with the aircraft engine and comprises:

a concentric circular projection with a diameter less than the diameter of the base plate, wherein the concentric circular projection comprises at least two arc-shaped slots arranged diametrically opposite to each other; and a projected arch along the boundary of the base plate;

a plurality of blades with a meshed structure of a predetermined shape operatively coupled with the base plate, wherein the meshed structure allows airflow and prevents overlapping of a blade pair;

a blade actuating ring operatively coupled with the plurality of blades by means of a plurality of pins, wherein the blade actuating ring is configured to:

oscillate based on the generated signal thereby opening and closing of the plurality of blades wherein the closing of the plurality of blades prevents the one or more foreign bodies to strike the aircraft engine, wherein the blade actuation ring is coupled with a top plate by means of a plurality of pins, wherein the top plate comprises a circular structure with the at least two arc-shaped slots on the surface of the circular structure.

2. The system as claimed in claim 1, wherein the analysis module is configured to activate an Iris mechanism via the generated signal, to open and close the blade arrangement based on the plurality of data fetched from the plurality of sensors.

3. The system as claimed in claim 2, wherein the Iris mechanism closes the blade arrangement until the one or more foreign bodies are detected as an obstacle, thereby protecting the aircraft engine automatically from the one or more foreign objects.

4. The system as claimed in claim 1, wherein the sensing module comprises a motion sensor configured to detect a motion of the one or more foreign objects to activate an image-capturing device by using passive infrared detection technology.

5. The system as claimed in claim 1, wherein the sensing module comprises a motion detection camera configured with motion activation, wherein the motion detection camera is triggered by the motion sensor.

6. The system as claimed in claim 1, wherein the sensing module comprises an infrared sensor to detect the presence of the one or more foreign objects within a proximity from the aircraft engine.

7. The system as claimed in claim 1, wherein the plurality of blades is actuated to an open and close position by means of a motor.

8. The system claimed in claim 1, wherein the analysis module is configured with an on-board diagnosis mechanism to activate the protecting unit in response to detecting the presence of the foreign objects based on the sensor fusion.

9. The system as claimed in claim 1, wherein the sensor fusion is a process of merging an output of the plurality of sensors to reduce the uncertainty in the generated signals.

10. A method for operating the system for preventing the striking of foreign bodies on an aircraft engine comprises:

obtaining, by a sensing module, a plurality of data related to the presence of one or more foreign objects within a proximity of the aircraft engine;

enabling, by an analysis module, sensor fusion upon receiving the plurality of data from the sensing module to retrieve meaningful results pertaining to the presence of the one or more foreign objects using artificial intelligence;

detecting, by an analysis module, the presence of the foreign objects based on the sensor fusion;

generating, by an analysis module, a signal upon detecting the presence of the one more foreign objects;

receiving, by a protecting unit, the generated signal from the analysis module;

allowing, by a plurality of blades airflow and preventing overlapping of the blade pair; and oscillating, by a blade actuating ring, based on the generated signal thereby opening and closing of the plurality of blades wherein the closing of the plurality of blades prevents the one or more foreign bodies to strike the aircraft engine.

* * * * *